(12) United States Patent
Nakamura et al.

(10) Patent No.: US 6,569,516 B1
(45) Date of Patent: *May 27, 2003

(54) TRANSPARENT LAMINATE AND PLASMA DISPLAY PANEL FILTER UTILIZING SAME

(75) Inventors: Toshitaka Nakamura, Osaka (JP); Kazuaki Sasa, Osaka (JP); Yoshihiro Hieda, Osaka (JP); Kazuhiko Miyauchi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/729,785

(22) Filed: Dec. 6, 2000

(30) Foreign Application Priority Data

Dec. 10, 1999 (JP) .......................... 11-351094

(51) Int. Cl.$^7$ .......................... B32B 5/12; B32B 7/02; B32B 9/04; B32B 15/00
(52) U.S. Cl. .................. 428/212; 428/213; 428/214; 428/109; 428/411.1; 428/432
(58) Field of Search .................. 428/212, 432, 428/109, 213, 214, 411.1

(56) References Cited

U.S. PATENT DOCUMENTS 6,235,398 B1 * 5/2001 Nakamura et al. .......... 428/432
6,252,703 B1 * 6/2001 Nakamura et al. .......... 359/360

FOREIGN PATENT DOCUMENTS

| JP | 10-264287 | 10/1998 |
| JP | 3004222 | 11/1999 |

* cited by examiner

Primary Examiner—Cynthia H. Kelly
Assistant Examiner—L. Ferguson
(74) Attorney, Agent, or Firm—McGinn & Gibb, PLLC

(57) ABSTRACT

A transparent laminate is constituted by a transparent substrate, a low refractive index transparent thin film formed on a surface of the transparent substrate, between three and five combination layers laminated successively on a surface of the first low refractive index transparent thin film, another high refractive index transparent thin film formed on a surface of the combination layers, and an outermost layer. The combination layers has high refractive index transparent thin films and silver type transparent electrical conductor thin films, each combination layer having one high refractive index transparent thin film and one silver type transparent electrical conductor thin film. The outermost layer is stuck through a transparent adhesive agent layer onto a surface of the high refractive index transparent thin film farthest from the transparent substrate. The outermost layer is at least one of selected from the group of consisting of an anti-reflection film, an anti-mirroring film and a low reflection anti-mirroring film. The low refractive index transparent thin film is an optically transparent thin film having a refractive indexing in a range of 1.3 to 1.6 and each of the high refractive index transparent thin film is an optically transparent thin film having a refractive index $n_H$ in a range of from 1.9 to 2.5.

20 Claims, 3 Drawing Sheets

TRANSPARENT LAMINATE AND PLASMA DISPLAY PANEL FILTER UTILIZING SAME

BACKGROUND OF THE INVENTION

1. Field of the Invention

The present invention relates to a transparent laminate and a filter using the transparent laminate for use in a plasma display panel (hereinafter referred to as PDP). Particularly, it relates to a PDP filter disposed on the front surface of a PDP which has a basic function of simultaneously cutting electromagnetic waves and near-infrared rays theoretically generated from the PDP and which is superior in visible light transmission characteristic, visible light low reflection characteristic and surface mar-proofness, and a PDP display unit and a PDP front plate provided with the filter stuck thereto.

The present application is based on Japanese Patent Application No. Hei. 11-351094, which is incorporated herein by reference.

2. Description of the Related Art

Transparent laminates each having a metal thin film layer put between transparent dielectric film layers have been discussed with the advance of thin-film-forming technology represented by a vacuum vapor deposition method or a sputtering method. These transparent laminates can utilize both electrically conducting characteristic and infrared reflection characteristic of the metal thin film layer and can provide a function of preventing reflection of visible light on a metal surface by means of the transparent dielectric film layers. For example, these transparent laminates are used in transparent heat-insulating materials for solar cells, green houses for agriculture, window materials for buildings, show-cases for food, and so on, because these transparent laminates transmit visible light rays and reflect heat rays. Further, these laminates are used suitably in electrodes for liquid-crystal displays, electrodes for field light-emitters, electromagnetic wave shielding films, antistatic films, and so on, because these laminates are transparent and exhibit high electrically conducting characteristic. The configurations of these transparent laminates are disclosed, for example, in Japanese Patent Publications No. Sho. 55-11804, Hei. 9-176837, and so on.

On the other hand, with respect to display technology, a plasma display panel (hereinafter referred to as PDP) has been developed as a large-screen display in compliance with the wishes of reduction of thickness and weight and increase of screen size. The PDP generates electric discharge in a gas mainly containing a rare gas, especially neon, enclosed in the panel. Fluorescent substances of R, G and B applied on cells in the panel are made to emit light by vacuum ultraviolet rays generated by the electric discharge. In this light-emitting process, electromagnetic waves and near-infrared rays unnecessary for the operation of the PDP are emitted simultaneously. Particularly, electromagnetic waves not only cause malfunctions of peripheral devices but also have a bad influence on human bodies. Accordingly, it is necessary to cut the electromagnetic waves. Further, the wave length of the near-infrared rays emitted is in a range of from 850 to 1200 nm. On the other hand, the light-receiving sensitivity of remote controllers for domestic electrification products, karaoke, audio and video appliances, and so on, is in a range of from 700 to 1300 nm. There arises a problem that near-infrared rays emitted from the PDP cause the malfunctions of the remote controllers. Accordingly, it is necessary to cut the intensive near-infrared rays theoretically generated from the PDP.

Therefore, a filter capable of simultaneously cutting electromagnetic waves and near-infrared rays generated from the PDP has been discussed. For example, a plate, or the like, formed by sticking or thermally fusion-bonding an acrylic sheet having metal mesh or etching mesh embedded therein to an acrylic sheet mixed with a dye type material for absorbing near-infrared rays has been heretofore used as the filter. Further, as another filter different from such mesh type filter, it has been investigated to apply the aforementioned transparent laminate to a PDP filter.

However, the mesh type filter was easy to obtain a low surface resistance value. The mesh type filter, however, had a problem in image blurring due to a moire phenomenon generated between pixel pitch and electrically conductive mesh, durability of a near-infrared absorbing material, and so on. Further, the amount of the near-infrared absorbing material to be added needed to increase in order to improve the near-infrared cut factor. With the increase of the amount of the near-infrared absorbing material, however, the defects of lowering of the visible light transmission factor and occurrence of color-eye could not be avoided. On the other hand, application of the aforementioned transparent laminate to a PDP filter has been discussed. It is however the existing circumstances that it is impossible to obtain any transparent laminate which can sufficiently satisfy various characteristics such as electromagnetic wave shielding characteristic, near-infrared cutting characteristic, visible light transmission characteristic, low reflection characteristic, low surface resistance, and so on.

SUMMARY OF THE INVENTION

In view of the above circumferences, an object of the present invention is to provide a transparent laminate especially suitably used as an optical basic member in a PDP filter, and a light and thin-type PDP filter which satisfies various characteristics such as electromagnetic wave shielding characteristic, near-infrared cutting characteristic, visible light transmission characteristic, visible light low reflection characteristic, low surface resistance, surface mar-proofness, and so on, required by the PDP filter and which is good in visual recognition characteristic. Another object of the present invention is to provide a PDP display unit and a PDP front plate provided with the PDP filter.

As a result of eager discussion in order to solve the above objects, the present inventors have attained the invention which is a transparent laminate comprising: a transparent substrate; a low refractive index transparent thin film formed on a surface of the transparent substrate; n units ($3 \leq n \leq 5$) of high refractive index transparent thin films and silver type transparent electrical conductor thin films each unit consisting of high refractive index transparent thin films and silver type transparent electrical conductor thin films, the n units being laminated successively on a surface of the low refractive index transparent thin film; another high refractive index transparent thin film formed on a surface of the n units; and another low refractive index transparent thin film formed on a surface of the other high refractive index transparent thin film, wherein each of the low refractive index transparent thin films is an optically transparent thin film having a refractive index $n_L$ in a range of from 1.3 to 1.6 and each of the high refractive index transparent thin films is an optically transparent thin film having a refractive index $n_H$ in a range of from 1.9 to 2.5.

In the above optical condition, it is preferable to satisfy the condition that the thickness of the low refractive index transparent thin film formed on a surface of the transparent substrate is 1×(λ/4n$_L$), the thickness of the low refractive index transparent thin film in the outermost layer is 2×(λ/4n$_L$), the thickness of each of the high refractive index transparent thin films adjacent to the low refractive index transparent thin films is (½)×(λ/4n$_H$), the thickness of each of the high refractive index films sandwiched between the silver type transparent electrical conductor thin films is 1×(λ/4n$_H$) and the thickness of each of the silver type transparent electrical conductor thin films is (⅕)×(λ/4n$_H$)×(n$_H$−1) when the optical center wavelength λ is 550 nm. In this condition, the thickness change of each of the low refractive index transparent thin films, the high refractive index transparent thin films and the silver type transparent electrical conductor thin films may be in a range of ±20%. Further, instead of forming the low refractive index transparent thin film in the outermost layer, an anti-reflection film, an anti-mirroring film or a low reflection anti-mirroring film is stuck through a transparent self-adhesive agent layer onto a surface of the high refractive index transparent thin film farthest from the transparent substrate.

In this invention, it is preferable that the high refractive index transparent thin film is a thin film made from one compound or two or more compounds selected from the group consisting of indium oxide, tin oxide, titanium dioxide, cerium oxide, zirconium oxide, zinc oxide, tantalum oxide, niobium pentoxide, and zinc sulfide. Further, it is preferable that the silver type transparent electrical conductor thin film is a thin film made from 90% or higher by weight of silver and one compound or two or more elements selected from the group consisting of gold, copper, palladium, platinum, manganese, and cadmium.

Further, the transparent laminate according to the present invention has been obtained by the examination on the factors such as the thickness, the number of configuration layers, the material, the refractive index, the forming manner, and so on, of each of the transparent thin film and the silver type transparent electrical conductor thin film; and by suitable design. It is therefore preferable that the transparent laminate has a visible light transmission factor of not lower than 50%, a visible light reflection factor of not higher than 5%, a surface resistance of not larger than 3Ω/□ and a near-infrared cut factor of not lower than 80% in a region of wave length longer than 800 nm. Further, it is preferable that the transparent laminate is provided with an anti-contamination layer having a thickness of not larger than 10 nm and formed on a surface of the low refractive index transparent thin film in the outermost layer.

Another mode of the present invention relates to a PDP filter using such a transparent laminate, and it is preferable that a transparent pressure sensitive adhesive layer having a thickness in a range of from 10 to 500 μm is formed on a rear surface of the transparent laminate. Owing to the formation of the above-mentioned transparent pressure sensitive adhesive layer, it is possible to provide a PDP display unit wherein a PDP filter is bonded directly to a front display glass portion of a PDP through a transparent pressure sensitive adhesive layer. Further, it is possible to provide a PDP front plate, wherein the front plate is provided with a PDP filter, and a transparent molded body disposed through an air layer on the front side of the PDP, the PDP filter being bonded through a transparent pressure sensitive adhesive layer to a surface of the transparent molded body opposite to the PDP side. In this case, an anti-glare layer or an anti-Newton-ring layer may be formed directly on the PDP side of the transparent molded body disposed through the air layer on the front side of the PDP or is formed on a transparent thin film and bonded through a transparent pressure sensitive adhesive layer to the PDP side of the transparent molded body. Such a PDP front plate is provided on the front surface of a PDP to constitute a PDP display unit.

Features and advantages of the invention will become understood from the following detailed description of the preferred embodiments described in conjunction with the attached drawings.

DETAILED DESCRIPTION OF THE PREFERRED EMBODIMENTS

Respective examples of a transparent laminate and a PDP filter according to the present invention will be described below specifically with reference to FIGS. 1 to 3.

Figure 1:
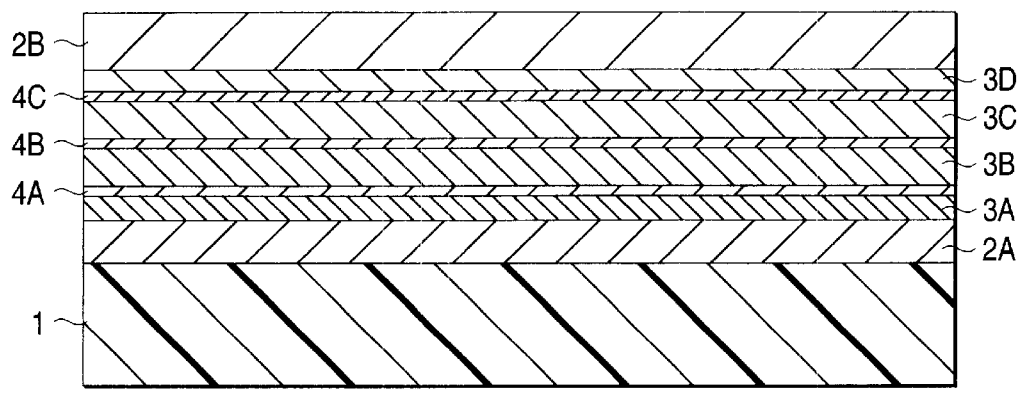
FIG. 1 is a schematic sectional view showing an embodiment of a transparent laminate according to the present invention.

FIG. 1 is a schematic sectional view showing a transparent laminate having a transparent substrate 1, a low refractive index transparent thin film 2A formed on a surface of the transparent substrate 1, units (for example, 3 units in FIG. 1) each consisting of a combination of a high refractive index transparent thin film (3A, 3B, 3C) and a silver type transparent electrical conductor thin film (4A, 4B, 4C) and laminated successively on a surface of the low refractive index transparent thin film 2A, a high refractive index transparent thin film 3D laminated on a surface of the silver type transparent electrical conductor thin film 4C, and a low refractive index transparent thin film 2B formed on a surface of the high refractive index transparent thin film 3D. Hereupon, each of the low refractive index transparent thin films (2A, 2B) is an optically transparent thin film having a refractive index n$_L$ in a range of from 1.3 to 1.6. Each of the high refractive index transparent thin films (3A, 3B, 3C, 3D) is an optically transparent thin film having a refractive index n$_H$ in a range of from 1.8 to 2.5.

The thicknesses of the respective films are designed as follows. When the optical center wavelength λ is 550 nm, the thickness of the low refractive index transparent thin film 2A formed on a surface of the transparent substrate is 1×(λ/4n$_L$), the thickness of the low refractive index transparent thin film 2B in the outermost layer is 2×(λ/4n$_L$), the thickness of each of the high refractive index transparent thin film 3A adjacent to the low refractive index transparent thin film 2A and the high refractive index transparent thin film 3D adjacent to the low refractive index transparent thin film 2B is (½)×(λ/4n$_H$), the thickness of each of the high refractive index transparent thin film 3B interposed between the silver type transparent electrical conductor thin films (4A, 4B) and the high refractive index transparent thin film 3C interposed between the silver type transparent electrical conductor thin films (4B, 4C) is $1\times(\lambda/4n_H)$ and the thickness of each of the silver type transparent electrical conductor thin films (4A, 4B, 4C) is $(\frac{1}{5})\times(\lambda/4n_H)\times(n_H-1)$. Further, the low refractive index transparent thin films, the high refractive index transparent thin films and the silver type transparent electrical conductor thin films can be used suitably if the thickness of each of the films is in a range of ±20% with the aforementioned thickness as a center.

Figure 2:
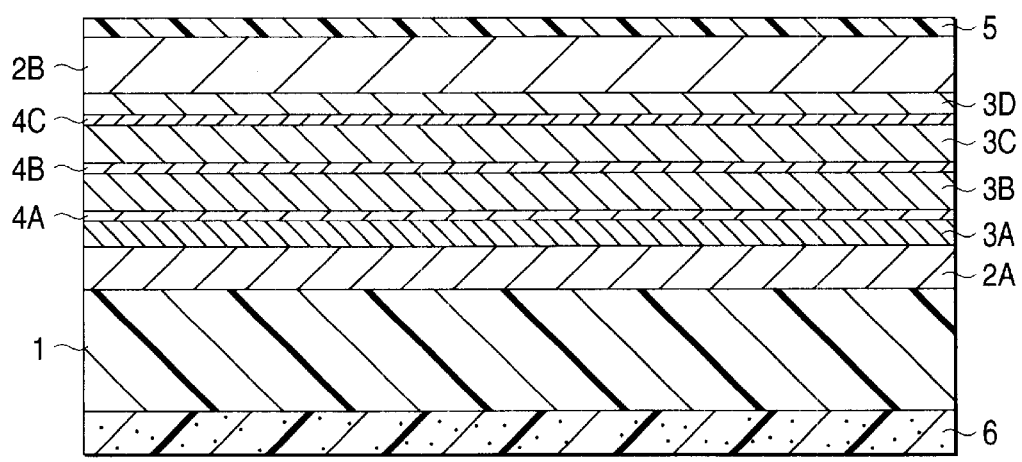
FIG. 2 is a schematic sectional view showing an embodiment of a filter for a plasma display panel according to the present invention.

FIG. 2 is a sectional view showing an example of a PDP filter using the transparent laminate depicted in FIG. 1. In FIG. 2, an anti-contamination layer 5 is formed on a front surface of the low refractive index transparent thin film 2B in the outermost layer and a transparent pressure sensitive adhesive layer 6 for sticking the PDP filter is formed on a rear surface of the transparent laminate, that is, on a rear surface of the transparent substrate 1.

When, for example, transparent materials having refractive indexes $n_L$ and $n_H$ of 1.4 and 2.0 are selected as material for a low refractive index transparent thin film material and material for a high refractive index transparent thin film respectively in the above description with reference to FIGS. 1 and 2, the thicknesses of the respective films are determined as follows.

Low refractive index transparent thin film 2A
: 98.2 nm±19.6 nm

High refractive index transparent thin film 3A, 3D
: 34.4 nm±6.9 nm

High refractive index transparent thin film 3B, 3C
: 68.8 nm±13.8 nm

Silver type transparent electrical conductor thin film 4A, 4B, 4C
: 13.1 nm±2.6 nm Low refractive index transparent thin film 2B
: 196.4 nm±39.3 nm Any substrate having transparency in a visible light region and having some degree of surface smoothness can be used as the transparent substrate 1 in the present invention. For example, polyethylene terephthalate, triacetyl cellulose, polyethylene naphthalate, polyether sulfone, polycarbonate, polyacrylate, polyether ether ketone, or the like, is preferable. The thickness of the substrate is not limited unless there is any problem in heat-wrinkling, or the like, in a dry process. Generally, a substrate having a thickness of from 10 to 250 μm is preferably used. A macromolecular film per se may be used as the substrate or a macromolecular film having a single surface or opposite surfaces coated with a hard coating layer may be used as the substrate. The hard coating layer may be of an ultraviolet-curable type or of a heat-curable type. The thickness of the hard coating layer is preferably in a range of from 1 to 10 μm.

In the present invention, the low refractive index transparent thin films 2A and 2B may be made from the same material or from different materials respectively. When different materials are used, the thicknesses of the films may be determined on the basis of the refractive indexes of the materials according to the rule of the present invention. Any optical film material having a low refractive index and being transparent in a visible light region can be used as a material for the low refractive index transparent thin films. The refractive index of each of the thin films is preferably in a range of from 1.3 to 1.6. Each of the thin films may be formed by a dry process such as a sputtering method, a vacuum vapor deposition method, an ion-plating method, or the like, or may be formed by a wet process such as a gravure coating method, a micro-gravure coating method, a reverse coating method, a dip coating method, or the like.

A material having good adhesion both to the transparent substrate 1 and to the high refractive index transparent thin film 3A is preferably used as the material for the low refractive index transparent thin film 2A. Further, an adhesion facilitating process may be performed, for example, by providing a primer coating layer on a surface of the transparent substrate. 1. Examples of the preferred material include: magnesium fluoride; silicon dioxide; silicon oxide, fluorine-containing silicon oxide; heat-curable or ultraviolet-curable fluorine type or silicon type macromolecular material; and so on.

The material used for the low refractive index transparent thin film 2B is preferably a material which is so excellent in mar-proofness as to serve as an overcoat layer in the outermost surface. Accordingly, it is preferable that the material is as thick as possible. According to the present invention, it is preferable that the refractive index of the material is as low as possible because the thickness of the film can increase as the refractive index decreases. More preferably, the low refractive index transparent thin film 2B per se may be made from a material having anti-contamination characteristic. Examples of the preferred material include: magnesium fluoride; silicon dioxide; silicon oxide, fluorine-containing silicon oxide; heat-curable or ultraviolet-curable fluorine type or silicon type macromolecular material; and so on.

An anti-contamination layer having a thickness of not larger than 10 nm may be further formed on a surface of the low refractive index transparent thin film 2B. When the thickness of the anti-contamination layer is not larger than 10 nm, anti-contamination characteristic can be provided without any change of optical characteristic of the transparent laminate because the anti-contamination layer is sufficiently thin relative to the wavelength of light in a visible light region. Examples of the material for the anti-contamination layer 5 include: a hardened material of an organic polysiloxane type polymer or of a perfluoroalkyl-containing polymer; an alkoxysilane compound having a perfluoroalkyl group; a compound having a perfluoropolyether group and a reactive silyl group; a mono-/di-silane compound having a perfluoroalkyl group; and so on.

Incidentally, if the low refractive index transparent thin film 2A is formed on a surface of the transparent substrate 1, an effect of reducing wavelength dependence of the visible light reflection factor can be obtained in comparison with the 25 case where the high refractive index transparent thin films (3A, 3B, 3C and 3D) and the silver type transparent electrical conductor thin films (4A, 4B and 4C) are laminated alternately directly on a surface of the transparent substrate 1 without forming the film 2A. In addition, an effect of reducing the average reflection factor on the whole of a visible light range can be also obtained, though the visible light reflection factor increases at a specific wavelength.

Further, the low refractive index transparent thin film 2B in the outermost layer is preferably selected so that the optical thickness of the film 2B is $\lambda/2$. In an optical thin film, a layer having a thickness integer times as large as $\lambda/2$ is called "nonexistent layer" because the layer can be attached/detached at a wavelength $\lambda$ without changing any optical characteristic. In the case where a transparent thin film having a suitable refractive index is formed with an optical thickness of $\lambda/2$ on a surface of the high refractive index transparent thin film 3D farthest from the transparent substrate 1 when, for example, λ is equal to 550 nm (optical center wavelength), the optical characteristic is not changed at 550 nm but changed largely in the other wavelength range. For example, the visible light reflection factor in the other wavelength range increases largely. The inventors of the present invention, however, have found that, if the refractive index $n_L$ of the low refractive index transparent thin film 2B in the outermost layer is selected to be in a range of from 1.3 to 1.6, the change of optical characteristic in a visible light range is minimized even in the case where the low refractive index transparent thin film 2B is formed in the outermost layer.

The inventors of the present invention have further found that the formation of the low refractive index transparent thin film 2A on a surface of the transparent substrate 1 prevents the optical characteristic such as visible light reflection factor, visible light transmission factor, etc. from being spoiled largely even in the case where an anti-reflection film, an anti-mirroring film or a low reflection anti-mirroring film is stuck through a transparent self-adhesive agent layer onto a surface of the high refractive index transparent thin film 3D farthest from the transparent substrate 1.

Figure 3:
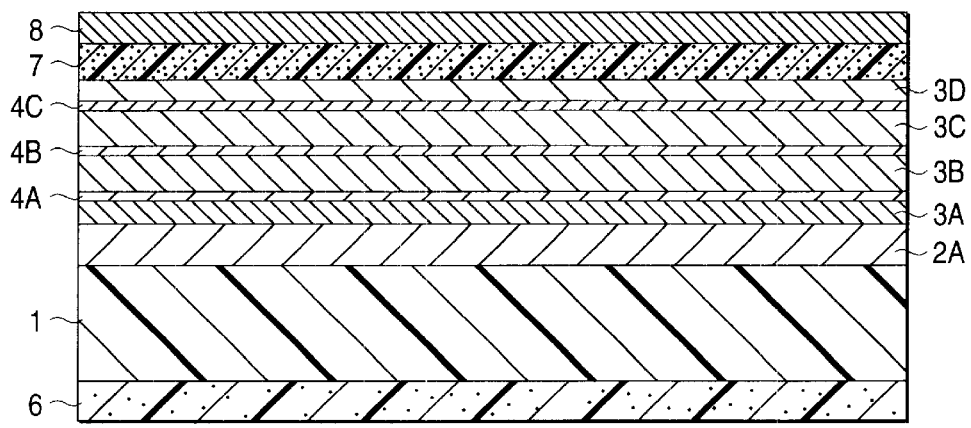
FIG. 3 is a schematic sectional view showing another embodiment of a filter for a plasma display panel according to the present invention

FIG. 3 shows, as an example of the above description, the configuration of the transparent laminate shown in FIG. 1. In the transparent laminate, an anti-reflection film 8 is stuck through a transparent self-adhesive agent layer 7 onto a surface of the high refractive index transparent thin film 3D farthest from the transparent substrate 1 instead of forming the low refractive index transparent thin film 2B in the outermost layer. Also in this case, a transparent self-adhesive agent layer 6 for sticking is formed on a rear surface of the transparent substrate 1 for the purpose of using the transparent laminate as a PDP filter.

A single-layer or multi-layer anti-reflection film formed by the background art on the film of polyethylene terephthalate, triacetylcellulose, or the like, which is the same as that in the transparent substrate 1 can be used directly as the anti-reflection film 8. When the anti-reflection film 8 is stuck on to a surface of the high refractive index transparent thin film 3D through the transparent self-adhesive agent layer 7, water or sulfide can be easily prevented from entering the silver type transparent electrical conductor thin films (4A, 4B and 4C). This brings a large effect for improvement of durability. Moreover, a good result can be obtained in terms of characteristic such as surface mar-proofness, anti-contamination characteristic, etc. Although the same material as the transparent self-adhesive agent layer 6 which will be described later can be used as the transparent self-adhesive agent layer 7 for sticking the anti-reflection film 8, the thickness of the transparent self-adhesive agent layer 7 is preferably selected to be not smaller than 5 μm, generally more preferably in a range of from 10 to 200 μm. The anti-reflection film 8 may be replaced by an anti-mirroring film made of a known anti-mirroring layer or a low reflection anti-mirroring film made of a known low reflection anti-mirroring layer, provided on the same film as that in the transparent substrate 1. Also these films can fulfill the same effect as described above.

Any optical film material having a high refractive index can be used to some degree as a material for the high refractive index transparent thin films (3A, 3B, 3C, 3D) The refractive index of each of the thin films is preferably in a range of from 1.9 to 2.5. According to the present invention, it is preferable in terms of reduction of surface resistivity that the refractive index of each of the high refractive index transparent thin films is set to be as high as possible, because the silver type transparent electrical conductor thin films can become thick without spoiling the visible light transmission characteristic. Further, a single high refractive index transparent material may be used or a sintered material made from a plurality of high refractive index transparent materials maybe used. Further, a material having an effect of preventing migration of the silver type transparent electrical conductor thin films and having a water/oxygen barrier effect may be used more preferably.

Examples of the preferable material include: a material containing indium oxide as a main component and containing a small amount of titanium dioxide, tin oxide or cerium oxide; titanium dioxide; zirconium oxide; zinc sulfide; bismuth oxide; niobium pentoxide; and so on. These thin films can be provided by a vacuum dry process such as sputtering, vacuum vapor deposition, ion-plating, or the like. Generally, the material containing indium oxide as a main component absorbs light, so that the extinction coefficient of the material is not always zero. In application of the relation between the refractive index of each transparent thin film and the thickness thereof in the present invention, it is, however, necessary to consider only the refractive index regardless of the extinction coefficient. In other words, the aforementioned relation is satisfied if the value of the refractive index $n_H$ is not treated as a complex number but treated as a mere real number. Incidentally, in order to obtain a high visible light transmission factor, it is preferable that the extinction coefficient is as small as possible.

A material for the silver type transparent electrical conductor thin films (4A, 4B, 4C, 4D) contains not less than 90% by weight of silver, and one element or two or more elements selected from the group consisting of gold, copper, palladium, platinum, manganese, and cadmium. A solid solution containing 90 to 99% by weight of silver, and 1 to 10% by weight of the aforementioned metal is preferably used as the material. Especially, a solid solution containing 1 to 10% by weight of gold in silver is preferable in terms of prevention of deterioration of silver. If the amount of gold to be mixed is larger than 10% by weight, specific resistance increases so that it is difficult to obtain a low resistance value. If the amount of gold is smaller than 1% by weight, deterioration of silver occurs easily. A vacuum dry process such as a sputtering method, or the like, is used as means for forming the silver type transparent electric conductor thin films.

As shown in FIGS. 2 and 3, the transparent pressure sensitive adhesive layer 6 is formed on the rear surface of the transparent substrate 1 for the PDP filter. When the transparent substrate 1 is stuck directly to the front display glass portion of the PDP through the transparent pressure sensitive adhesive layer 6, not only prevention of scattering of glass and reduction in weight, thickness and cost of the PDP per se can be achieved but also the air layer having a low refractive index is eliminated compared with the case where a front plate is disposed on a PDP body separately. Accordingly, the problem in increase of the visible light reflection factor due to superfluous interface reflection, double reflection, and so on, is solved, so that the visual recognition characteristic of the PDP is improved greatly.

A material having an elastic modulus of from $1\times10^5$ to $1\times10^7$ dyne/cm$^2$ and a thickness of from 10 to 500 μm, preferably from 25 to 300 μm, is used for the transparent pressure sensitive adhesive layer in the present invention. Examples of the material include an acrylic type pressure sensitive adhesive, a rubber type pressure sensitive adhesive, a polyester type pressure sensitive adhesive, and soon.

Especially, an acrylic type pressure sensitive adhesive is used preferably. As the acrylic type pressure sensitive adhesive, there is used a material formed by adding various additives such as a cross-linking agent, etc., to an acrylic type polymer. The acrylic type polymer is obtained by polymerizing a material including: at least one kind of alkyl (meth)acrylate esters exhibiting a glass transition point of not higher than −10° C. when polymerized, as main monomers for giving moderate wetness and flexibility as a pressure sensitive adhesive layer; and, if necessary, functional group-containing monomers such as acrylic acid, methacrylic acid, 2-hydroxyethyl acrylate, etc., and other copolymerizable monomers, by a method such as a solution polymerization method, an emulsion polymerization method, a self-polymerization method (especially a polymerization method using ultraviolet rays), a suspension polymerization method, or the like, with use of a suitable polymerization catalyst. The transparent pressure sensitive adhesive may be of a heat-crosslinkable type or may be of a photo-crosslinkable type (using ultraviolet rays or electron rays).

When the transparent pressure sensitive adhesive layer having the aforementioned characteristic is used, the transparent substrate 1 can be stuck to the front display glass of the PDP well because the transparent pressure sensitive adhesive layer absorbs undulation of the PDP glass surface when the transparent substrate 1 is directly stuck to the front display glass of the PDP. Further, even in the case where an alien substance from the outside collides with the film after the sticking, not only the cushioning effect of the pressure sensitive adhesive layer prevents the film surface from being injured but also the instantaneously reduced thickness of the pressure sensitive adhesive layer is self-restored soon if the transparent pressure sensitive adhesive layer satisfies the aforementioned condition. That is, there is obtained characteristic that the film surface is restored to a smooth surface as if nothing occurred.

Figure 5:
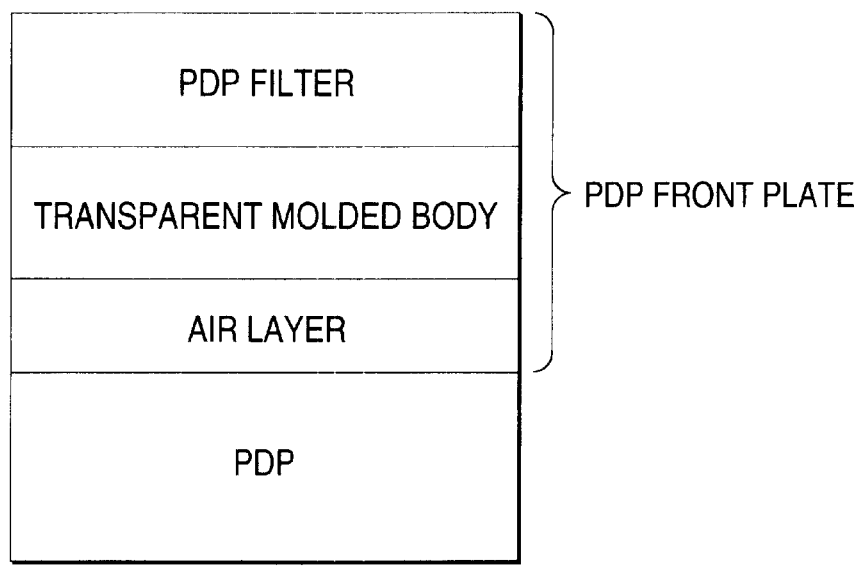
FIG. 5 is a schematic sectional view showing an embodiment of a front plate for a plasma display panel according to the present invention.
Figure 6:
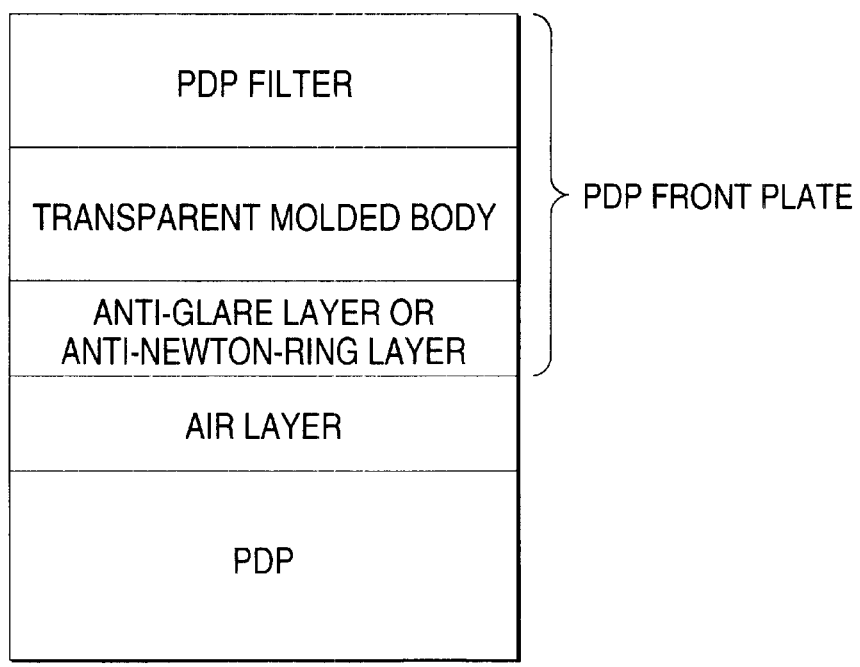
FIG. 6 is a schematic sectional view showing another embodiment of a front plate for a plasma display panel according to the present invention.

Further, in consideration of the fact that the strength of the front display glass is not satisfactory in the PDP producing process, the PDP front plate obtained by sticking the PDP filter through the transparent pressure sensitive adhesive layer onto the surface of a transparent molded body may be disposed, through an air layer, in the front side of the PDP (FIG. 5). In this case, a glass plate, an acrylic plate, a polycarbonate plate, or the like, may be used preferably as the transparent molded body but there is no specific limitation. Further, an anti-glare layer or an anti-Newton-ring layer may be formed directly on the PDP-side surface of the transparent molded body or formed on a transparent thin film and stuck through the transparent pressure sensitive adhesive layer to the PDP-side surface of the transparent molded body in the first example in order to suppress the occurrence of double reflection and Newton rings (FIG. 6). The above anti-glare layer or anti-Newton-ring layer means a layer which has slight surface roughness in a range of from about 0.1 μm to about 10 μm and which is transparent with respect to visible light rays. Known techniques may be applied to such an anti-glare layer or an anti-Newton-ring layer.

In the PDP filter or the PDP front plate in the present invention, a pigment, or the like, for adjusting the color tone of a transparent color may be used to be added, for example, to the transparent substrate, the transparent molded body, or the transparent pressure sensitive adhesive. Alternatively, a suitable layer obtained by dispersing the aforementioned pigment, or the like, in a binder resin may be provided on the PDP filter or the PDP front plate. Further, a circumferential edge portion of an electrically conductive surface of the transparent laminate needs to be electrically connected to the PDP for the purposes of improving an electromagnetic wave shielding effect and of preventing the electromagnetic wave shielding effect from lowering due to electromagnetic waves regenerated by electrical charges induced by absorbed electromagnetic waves. Generally, the high refractive index transparent thin film (3D in FIG. 2) is sufficiently thin, so that electrical connection can be achieved when, for example, electrically conductive paste, or the like, is formed on a surface of the high refractive index transparent thin film. Accordingly, when the low refractive index transparent thin film (2B in FIG. 2) in the outermost layer is to be applied and formed by a dry process or by a wet process, the low refractive index transparent thin film may be formed only on an opening portion so that electrical connection can be provided from the circumferential edge portion of the transparent laminate.

Electrodes can be formed in the circumferential edge portion, for example, by printing or applying electrically conductive paste available on the market, by laminating an electrically conductive tape or by forming a film of an alloy made from at least one element selected from silver, copper, gold, platinum, nickel, aluminum, chrome, zinc, etc. by a vacuum vapor deposition method, a sputtering method, or the like. However, there is no limitation.

The present invention will be described below more specifically on the basis of examples thereof but the present invention is not limited to the examples.

EXAMPLE 1

Transparent laminate samples (1) to (3) were produced by a method comprising the steps of: forming a low refractive index transparent thin film of $SiO_2$ on a single surface of a 125 μm-thick transparent polyethylene terephthalate (PET) film by a reactive pulse DC sputtering method; forming 3 to 5 units each consisting of a combination of a high refractive index transparent thin film and a silver type transparent electrical conductor thin film successively on a surface of the low refractive index transparent thin film by a DC magnetron sputtering method; forming a further high refractive index transparent thin film on a surface of the units; and forming a further low refractive index transparent thin film of $SiO_2$ thereon by a reactive pulse DC sputtering method. In the aforementioned production, Si was used as a target material for forming each of the low refractive index transparent thin films. $In_2O_3$ containing 12.6% by weight of $TiO_2$ (hereinafter abbreviated to "IT") was used as a target material for forming each of the high refractive index transparent thin films. Ag containing 5% by weight of Au (hereinafter abbreviated to "Ag") was used as a target material for forming each of the silver type transparent electrical conductor thin films.

In the transparent laminate samples (1) to (3), both the refractive index $n_L$ of $SiO_2$ and the refractive index $n_H$ of IT were measured at a wavelength of 550 nm by a spectral ellipsometer. Measurement results were as follows.

$n_L$=1.46 (extinction coefficient=0)

$n_H$=2.02 (extinction coefficient=0.0102)

In the aforementioned transparent laminate samples (1) to (3), the thicknesses of the respective films were calculated on the basis of the aforementioned results according to the present invention. As a result, the calculated thicknesses were as indicated by numerical values put in the following parentheses. Incidentally, the numerical values were expressed in terms of nm.

Sample (1): PET/SiO$_2$(94)/IT(34)/Ag(14)/IT(68)/Ag(14)/IT(68)/Ag(14)/IT(34)/SiO2(188)

Sample (2): PET/SiO$_2$(94)/IT(34)/Ag(14)/IT(68)/Ag(14)/IT(68)/Ag(14)/IT(68)/Ag(14)/IT(34)/SiO$_2$(188)

Sample (3): PET/SiO$_2$(94)/IT(34)/Ag(14)/IT(68)/Ag(14)/IT(68)/Ag(14)/IT(68)/Ag(14)/IT(34)/SiO2(188)

EXAMPLE 2

A transparent laminate sample (4) was produced in the same manner as that in Example 1 by a method comprising the steps of: forming an SiO2 thin film on a PET film; laminating 3 units each consisting of a combination of an IT thin film and an Ag thin film successively on a surface of the SiO2 thin film; forming a further IT thin film on a surface of the 3 units; and further sticking an available anti-reflection film ("REALOOK 201", made by Nippon Oils & Fats Co., Ltd.) directly onto a surface of the further IT thin film through a transparent self-adhesive agent layer by a roll laminator. The transparent laminate sample (4) had the same configuration as the transparent laminate sample (1) in Example 1 except that the anti-reflection film was stuck instead of the SiO2 thin film as the outermost layer. The thicknesses of the respective films were as indicated by numerical values put in the following parentheses (the numerical values were expressed in terms of nm).

Sample (4): PET/SiO$_2$(94)/IT(34)/Ag(14)/IT(68)/Ag(14)/IT(68)/Ag(14)/IT(34)/transparent self-adhesive agent layer/anti-reflection film

COMPARATIVE EXAMPLE 1

A transparent laminate sample (5) was produced in the same manner as that in Example 1 by a method comprising the steps of: forming an SiO2 thin film on a PET film; laminating 3 units each consisting of a combination of an IT thin film and an Ag thin film successively on a surface of the SiO2 thin film; forming a further IT thin film on a surface of the 3 units; and further forming an SiO2 thin film on a surface of the further IT thin film. The transparent laminate sample (5) was formed so that the thickness of each of the Ag layers was out of range in the present invention. The thicknesses of the respective films were as indicated by numerical values put in the following parentheses (the numerical values were expressed in terms of nm).

Sample (5): PET/SiO$_2$(94)/IT(34)/Ag(10)/IT(68)/Ag(15)/IT(68)/Ag(10)/IT(34) /SiO$_2$(188)

COMPARATIVE EXAMPLE 2

A transparent laminate sample (6) was produced in the same manner as that in Example 1 by a method comprising the steps of: forming an SiO2 thin film on a PET film; laminating 3 units each consisting of a combination of an IT thin film and an Ag thin film successively on a surface of the SiO2 thin film; forming a further IT thin film on a surface of the 3 units; and further forming an SiO2 thin film on a surface of the further IT thin film. The transparent laminate sample (6) was formed so that the thickness of some IT layers was out of range in the present invention. The thicknesses of the respective films were as indicated by numerical values put in the following parentheses (the numerical values were expressed in terms of nm).

Sample (6): PET/SiO$_2$(94)/IT(68)/Ag(14)/IT(68)/Ag(14)/IT(68)/Ag(14)/IT(68) /SiO$_2$(188)

COMPARATIVE EXAMPLE 3

A transparent laminate sample (7) was produced in the same manner as that in Example 1 by a method comprising the steps of: forming an SiO2 thin film on a PET film; laminating 3 units each consisting of a combination of an IT thin film and an Ag thin film successively on a surface of the SiO2 thin film; forming a further IT thin film on a surface of the 3 units; and further forming an SiO2 thin film on a surface of the further IT thin film. The transparent laminate sample (7) was formed so that the thickness of the SiO$_2$ layer adjacent to the PET film was out of range defined in the present invention. The thicknesses of the respective films were as indicated by numerical values put in the following parentheses (the numerical values were expressed in terms of nm).

Sample (7): PET/SiO$_2$(188)/IT(68)/Ag(14)/IT(68)/Ag(14)/IT(68)/Ag(14)/IT(68)/SiO$_2$(188)

COMPARATIVE EXAMPLE 4

A transparent laminate sample (8) was produced in the same manner as that in Example 1 by a method comprising the steps of: forming an SiO2 thin film on a PET film; laminating 3 units each consisting of a combination of an IT thin film and an Ag thin film successively on a surface of the SiO2 thin film; and forming a further IT thin film on a surface of the 3 units. The transparent laminate sample (8) had the same configuration as the transparent laminate sample (1) in Example 1 except that no SiO$_2$ layer was formed as the outermost layer. The thicknesses of the respective films were as indicated by numerical values put in the following parentheses (the numerical values were expressed in terms of nm).

Sample (8): PET/SiO$_2$(94)/IT(34)/Ag(14)/IT(68)/Ag(14)/IT(68)/Ag(14)/IT(34)

COMPARATIVE EXAMPLE 5

A transparent laminate sample (9) was produced in the same manner as that in Example 1 by a method comprising the steps of: laminating 3 units each consisting of a combination of an IT thin film and an Ag thin film successively on a PET film; forming a further IT thin film on a surface of the 3 units; and further forming an SiO2 thin film on a surface of the further IT thin film. The transparent laminate sample (9) had the same configuration as the transparent laminate sample (1) in Example 1 except that no SiO$_2$ layer was formed as a layer adjacent to the PET film. The thicknesses of the respective films were as indicated by numerical values put in the following parentheses (the numerical values were expressed in terms of nm).

Sample (9): PET/IT(34)/Ag(14)/IT(68)/Ag(14)/IT(68)/Ag(14)/IT(34)/SiO$_2$(188)

Figure 4:
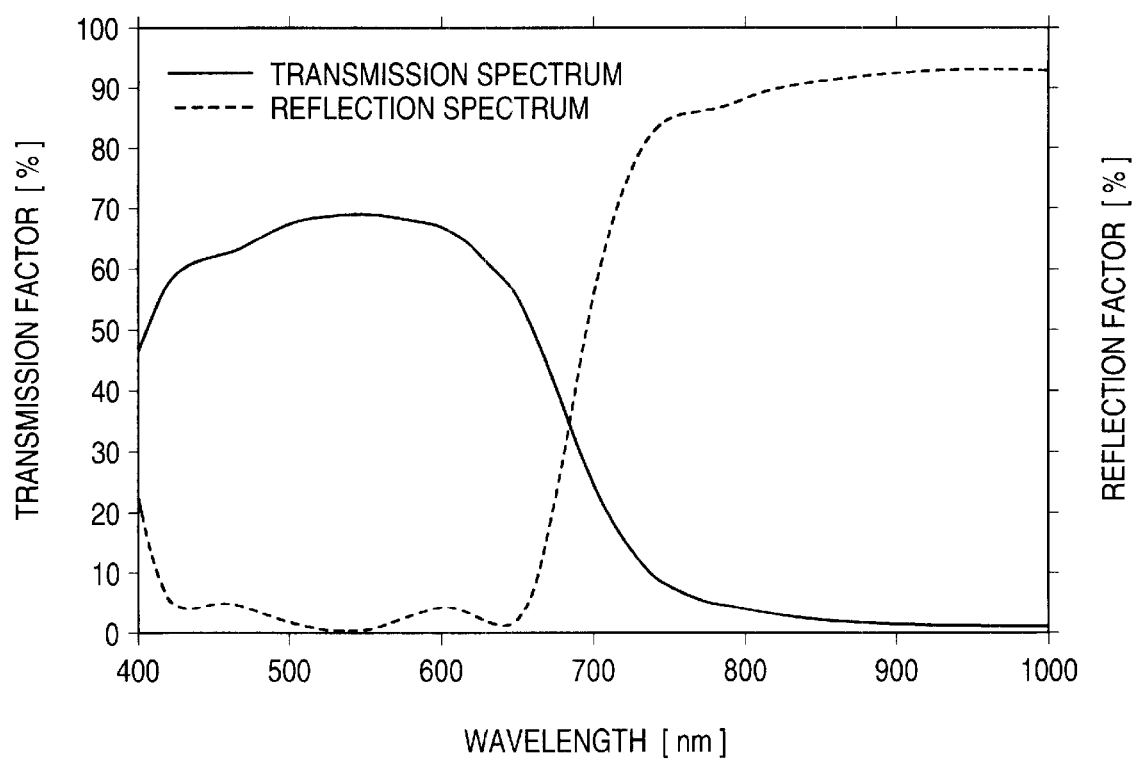
FIG. 4 is a spectral graph showing the optical characteristic of the sample (1) in Example 1.

Visible light transmission and reflection spectra expressing the optical characteristic of the transparent laminate sample (1) were examined and shown in FIG. 4.

It was apparent from FIG. 4 that the transparent laminate sample (1) had transparency in a visible light wavelength region and had characteristic of cutting near infrared rays (IR) having a wavelength of not smaller than 800 nm, and the transparent laminate sample (1) was designed so that the visible light reflection factor was minimized at a wavelength near 550 nm in which visibility by human eyes was the most intensive.

Then, the PDP filter characteristics of the transparent laminate samples (1) to (9) were examined and shown in Table 1. In Table 1, each surface resistance value was measured by use of "Lorester SP" made by Mitsubishi Petrochemical Co., Ltd. in the condition that an SiO2 thin film as the outermost layer had been not formed yet. Further, the optical characteristic was measured by use of "U-3410"

made by Hitachi Ltd. Especially, the reflection factor was measured in the condition that the surface having no thin film formed was painted with black color. Both the visible light transmission factor and the visible light reflection factor were calculated on the basis of obtained transmission and reflection spectra in accordance with JIS R-3016. Further, the IR cut factor (%) was expressed in terms of a near infrared ray cut factor with respect to near infrared rays in a wavelength range of from 800 to 1200 nm. Further, the mar-proof test was performed by rubbing each sample with steel wool #0000 ten times under a load of 250 g/cm$^2$ and by evaluating the degrees of scratches on the surface of the sample by eye observation to thereby make evaluation with a mark ○ which represents absence of scratches and a mark X which represents presence of scratches.

TABLE 1

|  | Sample No. | Surface Resistance Value (Ω/□) | Visible Light Transmission Factor (%) | IR Cut Factor (%) | Visible Light Reflection Factor (%) | Mar-Proof Test |
|---|---|---|---|---|---|---|
| Examples | (1) | 1.8 | 67 | 95 | 1.8 | ○ |
|  | (2) | 1.4 | 60 | 96 | 2.3 | ○ |
|  | (3) | 1.1 | 53 | 98 | 2.0 | ○ |
|  | (4) | 1.8 | 63 | 97 | 2.8 | ○ |
| Comparative Examples | (5) | 2.4 | 63 | 88 | 8.5 | ○ |
|  | (6) | 1.8 | 53 | 95 | 19.1 | ○ |
|  | (7) | 1.8 | 65 | 95 | 4.6 | ○ |
|  | (8) | 1.8 | 68 | 93 | 1.5 | X |
|  | (9) | 1.8 | 65 | 95 | 4.8 | ○ |

It was apparent from the results of Table 1 that each of the transparent laminate samples (1) to (4) produced according to the present invention as described in Examples 1 and 2 simultaneously satisfied electromagnetic wave shielding characteristic, IR cut characteristic, visible light transmission characteristic, visible light low reflection characteristic and surface mar-proofness which are generally required of the PDP filter.

Incidentally, in the transparent laminate samples (1) to (3) in Example 1, the samples (2) and (3) having four or five silver type transparent electrical conductor thin film layers were preferably low in surface resistance in comparison with the sample (1) having three silver type transparent electrical conductor thin film layers. The samples (2) and (3), however, became low in visible light transmission factor simultaneously. The sample (1) which can satisfy the surface resistance value (of not higher than 3 Ω/□) necessary for electromagnetic wave shielding of the PDP filter is generally preferable in terms of the production process and cost. Further, in the transparent laminate sample (4) in Example 2, the visible light reflection factor was 2.8% which was a slightly large value. This was caused by the fact that the anti-reflection film used in the sample (4) was of a single-layer type and the visible light reflection factor of the anti-reflection film itself was 1.3%. Therefore, reflection can be made lower if a multi-layer type anti-reflection film with low reflection is used.

On the contrary, the transparent laminate sample (5) described in Comparative Example 1 did not satisfy the characteristic required of the PDP filter because the surface resistance value was high and the IR cut factor was low. Furthermore, the visible light reflection factor of the sample (5) became high. The transparent laminate sample (6) described in Comparative Example 2 could not be used as a PDP filter not only because the visible light transmission factor, especially the transmission factor at a wavelength near 480 nm, was reduced greatly, but also because the visible light reflection factor exhibited a very large value of 19.1%. The transparent laminate sample (7) described in Comparative Example 3 was unsatisfactory because the visible light reflection factor exhibited a high value of 4.6%.

The transparent laminate sample (8) which was described in Comparative Example 4 exhibited a surface resistance value equal to that of the transparent laminate sample (1) and was excellent both in visible light transmission factor and in visible light reflection factor. The transparent laminate sample (8) was, however, poor for mar-proofness. Since the sample (8) was configured so that an IT thin film simply having a thickness of 34 nm was formed on a surface of the silver type transparent electrical conductor thin film poor for mar-proofness, remarkable scratches were observed on the filter surface after the mar-proof test. Accordingly, the configuration in which this filter was used as the outermost layer could not be used. The transparent laminate sample (9) which was described in Comparative Example 5 satisfied mar-proofness but was unsuitable for a PDP filter because the visible light reflection factor was high.

EXAMPLE 3

A fluorine type heat-curable macromolecular material (trade name: "LR-201" made by Nissan Chemical Industries, Ltd.) having a refractive index of 1.36 as a low refractive index transparent thin film material was applied on a 125 μm-thick PET film by a gravure coating method. Then, 3 units each consisting of a combination of an IT thin film and an Ag thin film were laminated successively on a surface of the low refractive index transparent thin film. Then, a further IT thin film was formed on a surface of the 3 units. Then, an SiO2 thin film was formed on a surface of the further IT thin film by a reactive pulse DC sputtering method. Thus, a transparent laminate sample (10) was produced. The thicknesses of the respective films were as indicated by numerical values put in the following parentheses (the numerical values were expressed in terms of nm).

Sample (10): PET/LR-201(101)/IT(34)/Ag(14)/IT(68)/Ag(14)/IT(68)/Ag(14)/IT(34)/SiO$_2$(188)

EXAMPLE 4

An SiO2 thin film was formed on a 125 μm-thick PET film by a reactive pulse DC sputtering method. Then, 3 units each consisting of a combination of an IT thin film and an Ag thin film were laminated successively on a surface of the SiO2 thin film. Then, a further IT thin film was formed on a surface of the 3 units. An acrylic type ultraviolet-curable hard coating material (trade name: "Z7501" made by JSR Co., LTD.) having a refractive index of 1.50 was applied on a surface of the further IT thin film by a gravure coating method. Thus, a transparent laminate sample (11) was produced. The thicknesses of the respective films were as indicated by numerical values put in the following parentheses (the numerical values were expressed in terms of nm).

Sample (11): PET/SiO$_2$(94)/IT(34)/Ag(14)/IT(68)/Ag(14)/IT(68)/Ag(14)/IT(34)/Z7501(183)

COMPARATIVE EXAMPLE 6

A TiO$_2$ film having a refractive index of 2.36 was formed on a 125 μm-thick PET film by a vacuum evaporation method. Then, 3 units each consisting of a combination of an IT thin film and an Ag thin film were laminated successively on a surface of the TiO$_2$ film. Then, a further IT thin film was formed on a surface of the 3 units. Then, an SiO2 thin film was formed on a surface of the further IT thin film by a reactive pulse DC sputtering method. Thus, a transparent laminate sample (12) was produced. The thicknesses of the respective films were as indicated by numerical values put in the following parentheses (the numerical values were expressed in terms of nm).

Sample (12): PET/TiO$_2$(58)/IT(34)/Ag(14)/IT(68)/Ag(14)/IT(68)/Ag(14)/IT(34)/SiO$_2$(188)

COMPARATIVE EXAMPLE 7

An SiO2 thin film was formed on a 125 μm-thick PET film by a reactive pulse DC sputtering method. Then, 3 units each consisting of a combination of an IT thin film and an Ag thin film were laminated successively on a surface of the SiO2 thin film. Then, a further IT thin film was formed on a surface of the 3 units. A TiO$_2$ film having a refractive index of 2.36 was further formed on a surface of the further IT thin film by a vacuum evaporation method. Thus, a transparent laminate sample (13) was produced. The thicknesses of the respective films were as indicated by numerical values put in the following parentheses (the numerical values were expressed in terms of nm).

Sample (13): PET/SiO$_2$(94)/IT(34)/Ag(14)/IT(68)/Ag(14)/IT(68)/Ag(14)/IT(34)/TiO$_2$(115)

COMPARATIVE EXAMPLE 8

A TiO$_2$ film having a refractive index of 2.36 was formed on a 125 μm-thick PET film by a vacuum evaporation method. Then, 3 units each consisting of a combination of an IT thin film and an Ag thin film were laminated successively on a surface of the TiO$_2$ film. Then, a further IT thin film was formed on a surface of the 3 units. Then, a TiO$_2$ film was formed on a surface of the further IT thin film. Thus, a transparent laminate sample (14) was produced. The thicknesses of the respective films were as indicated by numerical values put in the following parentheses (the numerical values were expressed 5 in terms of nm).

Sample (14): PET/TiO$_2$(58)/IT(34)/Ag(14)/IT(68)/Ag(14)/IT(68)/Ag(14)/IT(34)/TiO$_2$(115)

The PDP filter characteristics of the transparent laminate samples (10) to (14) were examined in the same manner as described above. Results of the examination were as shown in Table 2.

TABLE 2

| Sample No. | Surface Resistance Value (Ω/□) | Visible Light Transmission Factor (%) | IR Cut Factor (%) | Visible Light Reflection Factor (%) | Mar-Proof Test |
|---|---|---|---|---|---|
| Examples (10) | 1.8 | 66 | 95 | 1.7 | ○ |
| (11) | 1.8 | 66 | 95 | 2.1 | ○ |
| Comparative (12) | 1.8 | 51 | 94 | 20.5 | ○ |
| (13) | 1.8 | 64 | 94 | 5.0 | ○ |
| Examples (14) | 1.8 | 49 | 94 | 23.5 | ○ |

The transparent laminate sample (10) described in Example 3 and the transparent laminate sample (11) described in Example 4 were different from each other in kind and forming method of the low refractive index transparent thin film adjacent to the PET surface or of the low refractive index transparent thin film as the outermost layer. In each of the samples (10) and (11), however, the refractive index of the low refractive index transparent thin film was in a range defined in the present invention. Accordingly, as shown in Table 2, it was proved that a filter satisfying the characteristic generally required of a PDP filter was obtained when the thicknesses of the respective films were determined according to the present invention. As a result, it was apparent that, for example, a material having good adhesion to a base film, a material having both surface mar-proofness and anti-contamination characteristic, or the like, can be used suitably so long as the refractive index is in a range defined in the present invention.

On the contrary, the transparent laminate sample (12) described in Comparative Example 6 and the transparent laminate sample (13) described in Comparative Example 7 have shown the case where the low refractive index transparent thin film adjacent to the PET surface or the low refractive index transparent thin film formed as the outermost layer was replaced by a TiO$_2$ film which was a high refractive index transparent thin film out of the range defined in the present invention. In this case, both reduction of the visible light transmission factor and remarkable increase of the visible light reflection factor occurred as shown in Table 2. Accordingly, each of the samples (12) and (13) still could not be used as a PDP filter. The transparent laminate sample (14) described in Comparative Example 8 has shown the case where both the low refractive index transparent thin film adjacent to the PET surface and the low refractive index transparent thin film formed as the outermost layer were replaced by TiO$_2$ films which were high refractive index transparent thin films. The refractive indexes were out of the range defined in the present invention. Accordingly, in this case, both reduction of the visible light transmission factor and remarkable increase of the visible light reflection factor were observed as shown in Table 2.

EXAMPLE 5

A silane coupling agent (trade name: "KP801M" made by Shin-etsu Chemical Industry Co., Ltd.) having a perfluoroalkyl group was used as an anti-contamination material so that an anti-contamination layer having a thickness of about 8 nm was formed, by a gravure coating method, on a surface of the SiO2 thin film which was formed as the outermost layer in the transparent laminate sample (1) described in Example 1. Thus, a transparent laminate sample (15) was produced. A surface of the transparent laminate sample (15) had a contact angle of 115° to water and was excellent in water repellency. Fingerprints or stains deposited on the sample surface could be wiped off easily. Further, with respect to the optical characteristic of the transparent laminate sample (15) having the anti-contamination layer formed, the sample (15) exhibited quite the same transmission and reflection spectra as those in the transparent laminate sample (1). It was confirmed that there was no change in optical characteristic because of the formation of the anti-contamination layer.

EXAMPLE 6

An acrylic type self-adhesive agent solution containing 20% by weight of a solid component was applied on a rear surface of the PET film in the transparent laminate sample (15) described in Example 5. The applied solution was dried at 150° C. for 5 minutes so that a transparent self-adhesive agent layer having a thickness of 100 μm and an elastic modulus of $1.0 \times 10^6$ dyne/cm$^2$ was formed. Incidentally, upon the production of the transparent laminate sample (15) used in this example, the circumferential edge portion of the outermost layer was masked to make SiO$_2$ not formed on the circumferential edge portion. This was for the purpose of forming an earthing electrode to improve the electromagnetic wave shielding effect. Further, the earthing electrode was formed by applying electrically conductive paste ("MSP-600F" made by Mitsui Chemicals, Inc.) available on the market. Thus, a PDP filter was produced.

The PDP filter was stuck directly to a PDP front display glass portion by a roll laminator so that a PDP display unit was produced. The PDP display unit was excellent in visual recognition characteristic because reflection of external light, double reflection, and so on, were suppressed sufficiently without spoiling the merits of being thin and light which merits were peculiar to the PDP. The electromagnetic wave shielding characteristic, near infrared ray cut characteristic, surface mar-proofness, etc. of the PDP display unit were also excellent because the PDP display unit succeeded to the characteristic of the transparent laminate sample (15) as it was.

EXAMPLE 7

The PDP filter, which was produced in Example 6 and in which both the transparent self-adhesive agent layer and the earthing electrode were formed, was stuck onto one main surface of a 3 mm-thick PMMA plate (trade name: "ACRYLITE" made by Mitsubishi Rayon Co., Ltd.) by a roll laminator. Further, an anti-glare film ("KB-N05S" made by Kimoto Co., Ltd.) available on the market was stuck onto the opposite surface of the PMMA plate through the transparent self-adhesive agent layer (the same as that used in Example 6) however having a thickness of 25 $\mu$m. Thus, a PDP front plate was produced so that the anti-glare film was disposed in opposition to the front side of the PDP display unit. As a result, not only did the PDP front plate succeed to the characteristic of the transparent laminate sample (1) as it was, but also the PDP front plate in which double reflection was prevented by the anti-glare layer was obtained. Incidentally, the anti-glare layer made the PDP front plate hazy increasingly.

In the transparent laminate according to the present invention, specific optical design are performed when low refractive index transparent thin films, high refractive index transparent thin films and silver type transparent electrically conductor thin films are laminated successively. Accordingly, there can be provided a PDP filter which satisfies surface mar-proofness simultaneously in addition to electromagnetic wave shielding characteristic, near-infrared cutting characteristic, visible light transmission characteristic and visible light low reflection characteristic particularly required by a PDP. Further, the present invention may be used suitably in the case where the PDP filter is used so as to be stuck directly to a front glass plate of a PDP display unit or in the case where the PDP filter is used as a front plate to be stuck to a transparent substrate. In any case, a PDP display unit excellent in optical characteristic can be provided.

While the presently preferred embodiment of the present invention has been shown and described, it is to be understood that the disclosure is for the purpose of illustration and that various changes and modification may be made without departing from the scope of the invention as set forth in the appended claims.

What is claimed is:

1. A transparent laminate, comprising:
a transparent substrate;
a low refractive index transparent thin film formed on a surface of said transparent substrate;
between three and five combination layers of high refractive index transparent thin films and silver type transparent electrical conductor thin films, each combination layer comprising one high refractive index transparent thin film and one silver type transparent electrical conductor thin film, said combination layers being laminated successively on a surface of said first low refractive index transparent thin film, and another high refractive index transparent thin film being formed on a surface of said combination layers; and
an outermost layer being stuck through a transparent adhesive agent layer onto a surface of said high refractive index transparent thin film farthest from said transparent substrate, said outermost layer being at least one of selected from the group of consisting of an anti-reflection film, an anti-mirroring film and a low reflection anti-mirroring film,
wherein said low refractive index transparent thin film comprises an optically transparent thin film having a refractive index $n_L$ in a range of 1.3 to 1.6 and each of said high refractive index transparent thin film comprises an optically transparent thin film having a refractive index $n_H$ in a range of from 1.9 to 2.5.

2. A transparent laminate according to claim 1, wherein a thickness of said low refractive index transparent thin film is $1 \times (\lambda/4n_L)$, a thickness of first high refractive index transparent thin film adjacent to said low refractive index transparent thin film is $(\frac{1}{2}) \times (\lambda/4n_H)$, a thickness of each of second high refractive index films sandwiched between said silver type transparent electrical conductor thin films is $1 \times (\lambda/4n_H)$, and a thickness of each of said silver type transparent electrical conductor thin films is $(\frac{1}{5}) \times (\lambda/4n_H) \times (n_H - 1)$ wherein $\lambda$ is an optical center wavelength equal to 550 nm.

3. A transparent laminate according to claim 2, wherein a thickness change of each of said low refractive index transparent-thin film, said high refractive index transparent thin films and said silver type transparent electrical conductor thin films varies no more than ±20%.

4. A transparent laminate according to claim 1, wherein each of said high refractive index transparent thin films is comprises one or more compounds selected from the group consisting of indium oxide, tin oxide, titanium dioxide, cerium oxide, zirconium oxide, zinc oxide, tantalum oxide, niobium pentoxide, and zinc sulfide.

5. A transparent laminate according to claim 1, wherein said silver type transparent electrical conductor thin film comprises at least 90% by weight of silver and a balance of one or more elements selected from the group consisting of gold, copper, palladium, platinum, manganese, and cadmium.

6. A transparent laminate according to claim 1, wherein said transparent laminate has a minimum visible light transmission factor of 50%, a maximum visible light reflection factor of 5%, a maximum surface resistance of 3 Ω/□ and a minimum near-infrared cut factor of 80% in a region of wave length longer than 800 nm.

7. A filter for a plasma display panel comprising a transparent laminate described in claim 1.

8. A filter for a plasma display panel according to claim 7, further comprising a transparent pressure sensitive adhesive layer having a thickness in a range of 10 to 500 $\mu$m formed on a bottom surface of said transparent laminate.

9. A plasma display panel display unit wherein a filter according to claim 8 is bonded directly to a front display glass portion of a plasma display panel through aid transparent pressure sensitive adhesive layer.

10. A front plate for use in a plasma display panel, comprising:

a filter according to claim 8; and a transparent molded body disposed through an air layer on a front side of said plasma display panel, said filter being bonded through a transparent pressure sensitive adhesive layer to a surface of said transparent molded body opposite to said plasma display panel.

11. A front plate for use in a plasma display panel according to claim 10, further comprising:

an anti-glare layer or an anti-Newton-ring layer formed directly on said plasma display panel side of said transparent molded body disposed through said air layer on said front side of said plasma display panel or formed on a transparent thin film and bonded through a transparent pressure sensitive adhesive layer to aid plasma display panel side of said transparent molded body.

12. A filter for a plasma display panel comprising a transparent laminate described in claim 2.

13. A filter for a plasma display panel comprising a transparent laminate described in claim 3.

14. A filter for a plasma display panel comprising a transparent laminate described in claim 4.

15. A filter for a plasma display panel comprising a transparent laminate described in claim 5.

16. A filter for a plasma display panel comprising a transparent laminate described in claim 6.

17. The transparent laminate according to claim 1, wherein said transparent adhesive agent layer has a thickness not smaller than 5 $\mu$m.

18. The transparent laminate according to claim 1, wherein said transparent adhesive agent layer has a thickness in a range from 10 to 200 $\mu$m.

19. The transparent laminate according to claim 1, wherein said transparent adhesive agent layer has an elastic modulus from $1 \times 10^5$ to $1 \times 10^7$ dyne/cm$^2$.

20. The transparent laminate according to claim 1, wherein said transparent adhesive agent layer comprises at least one of an acrylic-type pressure sensitive adhesive, a rubber-type pressure sensitive adhesive, a polyester-type pressure sensitive adhesive, a heat-crosslinkable-type adhesive and a photo-crosslinkable-type adhesive.

* * * * *